Nov. 17, 1970 K. A. DUKE 3,541,507

ERROR CHECKED SELECTION CIRCUIT

Filed Dec. 6, 1967 2 Sheets-Sheet 1

INVENTOR
KEITH A. DUKE

BY [signature]

ATTORNEY

Nov. 17, 1970 K. A. DUKE 3,541,507

ERROR CHECKED SELECTION CIRCUIT

Filed Dec. 6, 1967 2 Sheets-Sheet 2

United States Patent Office 3,541,507
Patented Nov. 17, 1970

3,541,507

ERROR CHECKED SELECTION CIRCUIT

Keith A. Duke, Wappingers Falls, N.Y., assignor to International Business Machines Corporation, Armonk, N.Y., a corporation of New York Filed Dec. 6, 1967, Ser. No. 688,521
Int. Cl. G06f *11/00;* G08c *25/00*
U.S. Cl. 340—146.1 5 Claims

ABSTRACT OF THE DISCLOSURE

A circuit for indicating an error in a subsystem comprising a transmission cable including a plurality of groups of $m$-out-of-$n$ coded inputs, a selection matrix for selecting a single $m$-out-of-$n$ coded input group, a selection address decoder for said selection matrix and an $m$-out-of-$n$ validity checker connected to the matrix output. An output from said matrix deviating from said $m$-out-of-$n$ code will produce an error signal.

BACKGROUND OF INVENTION

The transmission of coded information and especially binary coded information over a plurality of transmission lines, either withincomputer modules or between individual computer modules is of vital importance in present day computer systems. Additionally, it is often necessary to select desired groups of lines from among a great plurality of transmission line cable links. A typical selection system would normally comprise a selection matrix operated under control of an address decoder therefor which receives an appropriate selection address from elsewhere in the computer. The two most common types of failures occurring within such selection matrices are either a failure of the matrix to select any input group or the selection of more than one. In the past it has always been considered both difficult and expensive to check the operation of such selection matrices and decoders therefor. One type of checking system has comprised the use of a redundant selection matrix wherein two selection matrices and decoders are provided and the outputs checked for identity of output. If a failure in either has occurred, the outputs will differ for the great majority of errors. As is apparent, such a circuit duplication is quite expensive especially when a large number of selection matrices are utilized in a single computer system.

An even more expensive alternative to that suggested above is the use of an odd number of selection matrices, three or greater, wherein the outputs pass through majority voting circuitry wherein the output of said majority voting circuitry will provide the output of the majority of units. The great expense of the latter type of system is quite obvious and is normally used only where high reliability is an absolute necessity.

Various parity checking schemes utilizing parity bits as are well known in the art, have been widely used in the past to detect errors. However, such a scheme is not particularly suitable for such selection matrices since it would check errors in the data but not in the decoder or selector. In view of the above problems, it is apparent that less expensive means for detecting errors in binary data transmission and selection systems are in great demand in the computer industry.

SUMMARY AND OBJECTS

It has now been found that by utilizing $m$-out-of-$n$ coded input groups (i.e., groups of $n$ binary digits of which $m$ are "1's" and the rest "0's") of which there may be $p$ groups in a given transmission cable supplying the inputs to a selection matrix and by utilizing an $m$-out-of-$n$ Validity Checker in the output of said selection circuit, a greatly simplified error checking system is provided for said selection circuit and decoder. The resulting system will produce an error signal due to a single error in data appearing on the input transmission cable, the selection matrix, or the selection decoder. Further, if an error allows the proper output from the selection matrix, i.e., the proper $m$-out-of-$n$ code, no error will be indicated and the correct output will be transmitted to the desired location.

It is accordingly a primary object of the present invention to provide an improved error detection circuit.

It is a further object to provide an error checked circuit including switching or selection matrix and a decoder therefor.

It is yet another object of the present invention to provide such an error checked selection circuit for use with an input transmission cable including $p$ groups of $m$-out-of-$n$ coded inputs.

It is a still further object of the invention to provide such an error checked selection circuit including an $m$-out-of-$n$ decoder located in the output of the selection matrix.

The foregoing and other objects, features and advantages of the invention will be apparent from the following more particular description of a preferred embodiment of the invention, as illustrated in the accompanying drawings.

DRAWINGS

DESCRIPTION OF DISCLOSED EMBODIMENT

The objects of the present invention are accomplished in general by an error checked selection circuit including a data transmission means having $p$ groups of input data lines wherein each group contains $n$ lines having an $m$-out-of $n$ code thereon. Each of said input groups is connected to the appropriate selection gates of a selection matrix, said selection matrix being operable to pass a single one of said groups to its output. The selection matrix functions under control of a decoder therefor which receives a selection address from an external source. An $m$-out-of-$n$ validity checker is connected across the output of said selection matrix and is operable to produce an indication whenever the output from said selection matrix deviates from said $m$-out-of-$n$ code.

Thus, it may be seen that the circuit will produce an error indicating output if the particular selected input group were incorrect as received, if the selection matrix failed to pass any group therethrough or passed more than one group therethrough causing a code deviation and finally it will produce an indication of the selection address decoder produces no output or a greater than one selection or will even produce an error if an invalid address is received by the Decoder which cannot be translated into output through the selection matrix control gates.

Figure 2:
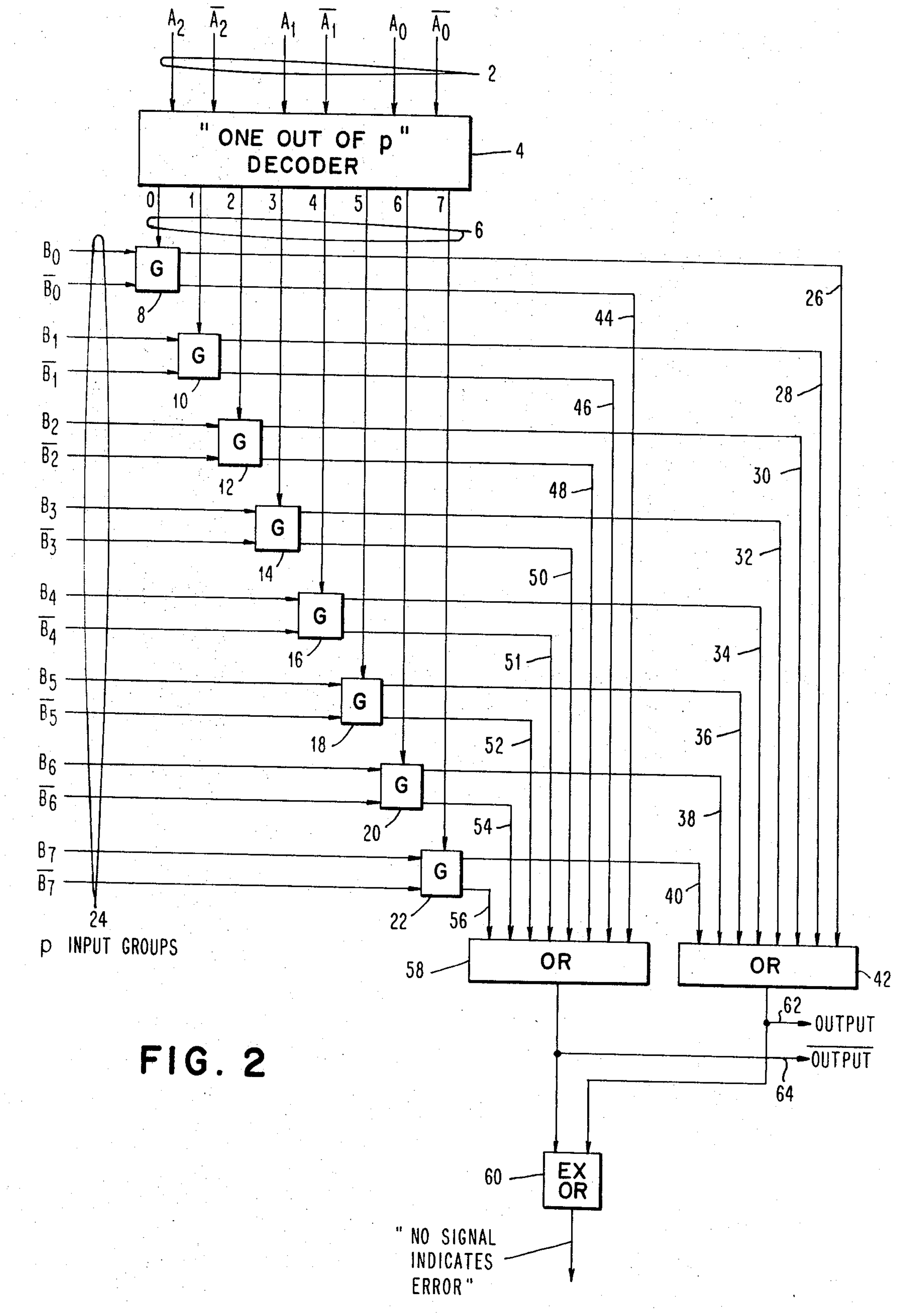
FIG. 2 is a logical schematic diagram of an error checked selection circuit for use with a transmission system comprising $p$ groups of one-out-of-two coded input lines.

While the specifically disclosed embodiment of FIG. 2 utilizes a one-out-of-two code, i.e., every logic bit is accompanied by its logical complement, it will be appreciated from the subsequent discussion that the concepts of the present invention would apply equally well to any $m$-out-of-$n$ code although the one-out-of-two code disclosed is most often utilized in present day computing systems.

Figure 1:
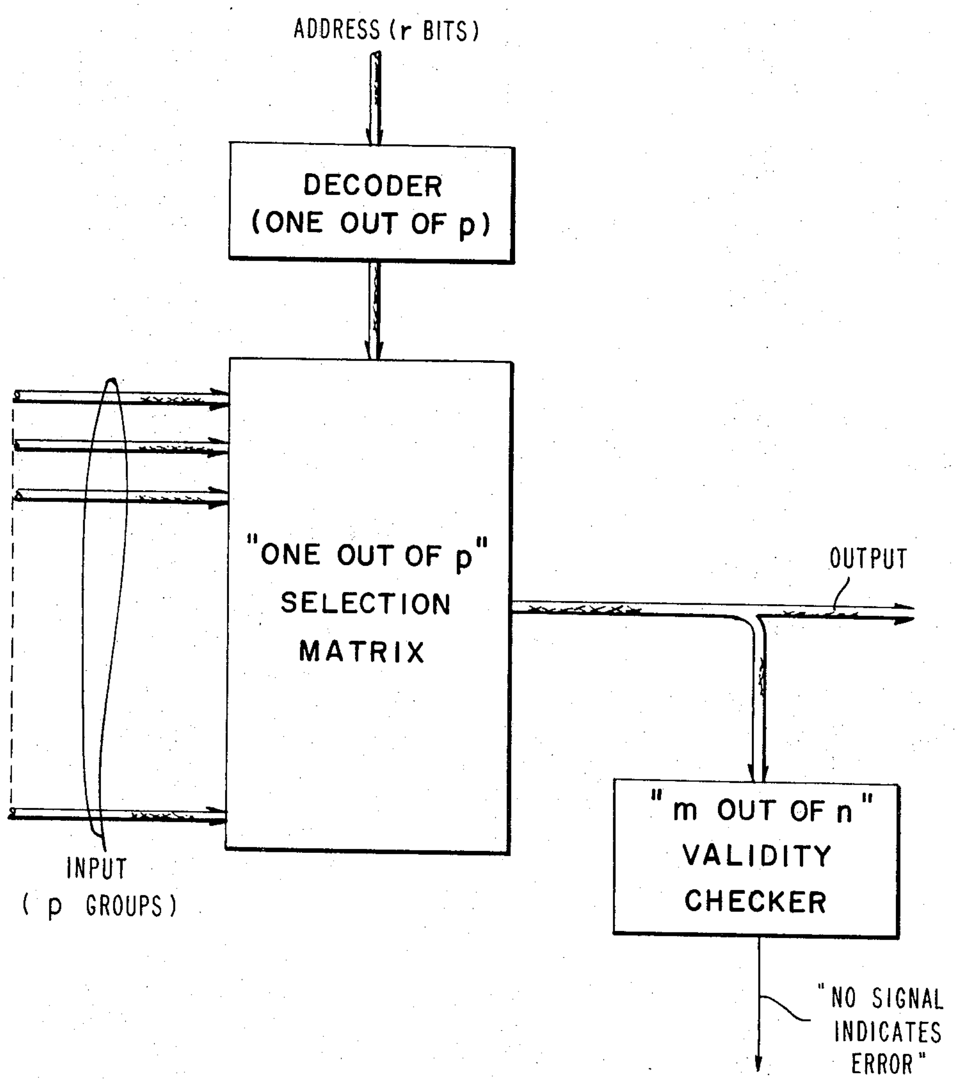
FIG. 1 is a functional block diagram of an error checked selection circuit as taught by the present invention.

The invention will now be described in its broader aspects with reference to FIG. 1 which, as stated previously, is a functional block diagram of an error checked selection circuit constructed in accordance with the teachings of the present invention. In the figure it will be noted that the input to the Selection Matrix block comprises $p$ groups of Input cables. Each of these cables contains $n$ individual binary data transmission lines, each capable of carrying a binary 1 or 0. The number of lines would of course be dependent upon the code selected and could vary from two to any desired number. However, as stated previously, one-out-of-two or three-out-of-five codes are more commonly encountered in present-day computing systems. It will be readily understood by those skilled in the art that said input cable containing a plurality of groups of input lines is connected to the control gates of the Selection Matrix which are operable to gate the contents of a desirbed input group to the output of the Selection Matrix. As will be further apparent only one of said control gates should be energized by the address Decoder at any one time. The input of the address Decoder would normally comprise a binary address of $r$ bits. Thus, r is selected so that $2^r \geqq p$. It will be apparent that if $p$ is less than $2^r$ it would be possible for an invalid address to be receiver by the Decoder which would result in none of its output lines being up, thus, indicating an error occurring in the address transmitted to the Decoder. Assuming however that a proper address is received, one output line from the Decoder will be activated to energize a single one of $p$ selection gates within the selection matrix thus connecting the desired input group to the Output of the Selection Matrix. Connected across the output of the Selection Matrix is a "$m$-out-of-$n$" validity checker which checks the "validity" of the output at the Selection Matrix. The output of this Checker may be utilized to produce an output as long as the output is correct as indicated in FIG. 1 and could thus control an output gate or could readily be utilized so than an output is produced only when an error occurs.

The construction of such $m$-out-of-$n$ validity checkers is well known in the art, the function being such that the output should contain $m$ binary "1's." Any departure from this total number of binary "1's" in the output being operable to produce an error signal. In the case of the one-out-of-two code of FIG. 2 this checker is merely an exclusive OR circuit. However, if a two-out-of-five, three-out-of-five, four-out-of-six, etc., code were to be used, additional logic circuitry would be required to test the output. A particular two-out-of-five validity checker is illustrated on page 227 of the "IBM Journal of Research and Development," April 1962.

For the two most common malfunctions of such selection matrices, i.e., no selection or two or more selections, the output would be no binary 1's or more than two binary 1's respectively (for a two-out-of-five code).

Thus, by utilizing an $m$-out-of-$n$ code with the input groupings supplied to the Selection Matrix and utilizing an $m$-out-of-$n$ validity checker in the output of said Selection Matrix, a very inexpensive and straight-forward error checking system is provided. While the system would not be able to reliably check multiple failures, it is capable of checking single failures which constitute the vast majority of such selection circuit malfunctions.

Referring now to FIG. 2, there is shown a logical schematic diagram of an error checked selection circuit constructed in accordance with the present invention utilizing a one-out-of-two input code in the input groups. The lines designated by the reference character 2 represent a binary number which is the address supplied through some other location in the system to the Decoder 4. This address is shown for convenience as comprising three binary digits which as will be well understood is capable of selecting any of the eight input groups illustrated. This address is applied to the Decoder 4. One of the lines represented by the reference character 6 will become active in response to the address supplied to the Decoder 4 and will enable one of the gates 8 through 22 inclusive. As stated previously, the lines indicated by the reference character 24 represent eight independent groups of binary input digits which are applied to the gates 8 through 22 inclusive. These groups of binary digits $B_0$, $\overline{B}_7$ $\overline{B}_0$ through $B_7$, represent one-out-of-two input coding such that each group contains exactly the same predetermined number of binary "1's," i.e., one of the input lines of the group will be a "1" and the other must be a "0." Any group having a different number of "1's," i.e., all "0's" or all "1's" must be an error. The two digits of each group shown in FIG. 2 will be referred to as "true" and "complement." Further, eight groups of digits are shown in the embodiment, however, in practice any desired number of groups may be utilized and the Decoder and Selection Matrix suitably modified. The true output of the gates 8 through 22 inclusive are the lines 26 through 40 inclusive. These lines are all connected to the OR circuit 42. The complement outputs of the gates 8 through 22 are the lines 44 through 56 inclusive. These lines all go to the OR circuit 58. The outputs of these two OR circuits 42 and 58 constitute the output of the Selection Matrix and are also connected to the Exclusive OR circuit 60. The Exclusive OR circuit 60 constitutes the $m$-out-of-$n$ Decoder of FIG. 1 for the one-out-of-two code situation as as mentioned previously. Thus, if the Exclusive OR circuit 60 produces no signal, it indicates that some situation other than a single binary 1 has occurred in the output of the two OR circuits 42 and 58.

In general, there will be as many OR circuits, such as 42 and 58 as there are bits in each group and the exclusive OR circuit 60 will be replaced by a circuit that will detect the appropriate number of 1's desired in the code.

As stated previously, this circuit is capable of detecting a plurality of different system failures including possible errors in the input bits B fed to the Selection Matrix and also in the address bits A supplied to the Decoder 4. If the Decoder fails in such a way that it provides no output OR circuits 42 and 58 will produce a "0" output which will be detected by the Exclusive OR circuit 60. If the Decoder yields two or more outputs, the output from the OR gates 42 and 58 will be an OR-ing of the selected groups. The output will thus contain the correct number of 1's only if all of the selected groups passing to the OR gates 42 and 58 contain identical patterns of binary digits. In this latter case, the output of the selector will technically be correct and no error will be signaled. If the selected patterns are not identical, obviously too many 1's will appear in the output and an error will be signaled. Failures of the gates 8 through 22 or failure of the OR circuits 42 or 58 will produce an incorrect number of 1's in the output thus resulting in an error signaled by the Exclusive OR 60.

It may thus readily be seen from the above description of generic case illustrated in FIG. 1 and of the specific embodiment illustrated in FIG. 2 that the presently disclosed error checked selection circuit provides a high degree of reliability with little additional hardware cost. The manner in which an error signal is used could take on a number of different forms, such as energizing indicator lights to indicate that a certain functional unit is not functioning whereup it may be replaced in toto or other diagnostic routines initiated. However, the particular use made of the indication is not considered a part of the invention and will not be further discussed.

It should be further noted that while the present embodiment has illustrated parallel data transmission, i.e., $n$ elements or lines in each of the $p$ groups, it would be possible to utilize $n$ serial bits still utilizing an $m$-out-of-$n$ code in a single line and thus have $p$ lines in the transmission cable. In this latter case a serial Validity Checker would be employed.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An error checked selection circuit comprising data transmission means including $p$ groups of $m$-out-of-$n$ coded input lines wherein $p$ is greater than 2, a selection matrix including $p$ gate circuit means operable to connect one of said $p$ groups to the output of said selection matrix by actuating one of said $p$ gate circuits, an address decoder for said selection matrix operable under control of a selection address to actuate a desired gate circuit means of said selection matrix, and an $m$-out-of-$n$ validity checker directly connected to the output of said selection matrix operable to produce an indication if said output does not contain an $m$-out-of-$n$ code thereon.

2. An error checked selection circuit as set forth in claim 1 wherein each of said $p$ groups of input lines comprises $n$ data lines wherein $m$ lines contain binary 1's and the remainder binary 0's, and wherein said $m$-out-of-$n$ validity checker for decoding the output of said selection matrix is a parallel device.

3. An error checked selection circuit as set forth in claim 2 wherein each of said $p$ groups comprises two lines, the signal appearing on one line being the logical complement of the signal appearing upon the other for a valid code condition, and said $m$-out-of-$n$ validity checker comprises an Exclusive OR circuit.

4. An error checked selection circuit as set forth in claim 2 wherein each of said $p$ groups of input lines connected to said selection matrix is selectively connected through separate gate circuit means to the $n$ output lines, each said gate circuit means having $n$ output lines and being selectively actuable by said address decoder, the $n$ outputs from each of said control gate means of said selection matrix being connected to $n$ OR circuits wherein the same relative output line from each gate circuit means is connected to the same OR circuit.

5. An error checked selection circuit including data transmission means comprising $p$ groups of one out of two coded input lines wherein $p$ is greater than 2, a selection matrix including means operable to connect one of said $p$ groups to the output of said selection matrix, said last-named means comprising $p$ gate circuit means, an address decoder for said selection matrix operable under control of a selection address to actuate one of said gate circuit means of said selection matrix, each of said gate circuit means having two output lines, the first output line of each control gate being connected to a first OR circuit and the second output line from each control gate connected to a second OR circuit, an Exclusive OR circuit having as its two inputs the outputs of said first and second OR circuits wherein the output of said first and second OR circuits comprise the output of said selection matrix and wherein the output of said Exclusive OR circuit is indicative of the validity of the output of the selection matrix.

References Cited

UNITED STATES PATENTS

| | | | |
|---|---|---|---|
| 3,011,148 | 11/1961 | Sauter | 340—147 |
| 3,237,157 | 2/1966 | Higby | 340—146.1 |
| 3,289,160 | 11/1966 | Carter et al. | 340—146.2 |
| 3,348,198 | 10/1967 | Winter | 340—146.1 |
| 3,381,270 | 4/1968 | Huffman et al. | 340—146.1 |
| 3,395,389 | 7/1968 | Zartoshtl | 340—146.1 |

MALCOM A. MORRISON, Primary Examiner

C. E. ATKINSON, Assistant Examiner

U.S. Cl. X.R.

235—153; 340—147, 347